Figure 1:
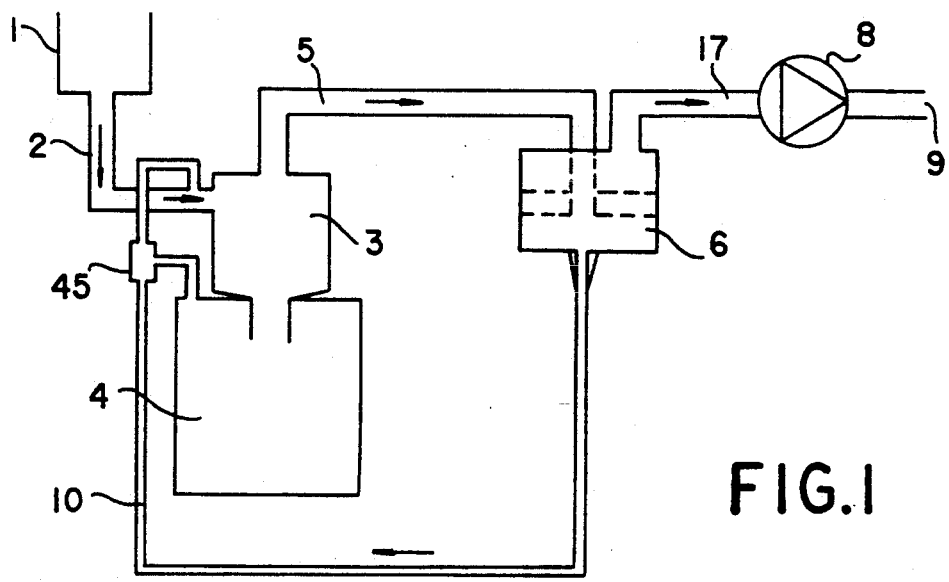

United States Patent [19]
Tertre et al.

[11] Patent Number: 5,234,483
[45] Date of Patent: Aug. 10, 1993

[54] NEGATIVE PRESSURE SANITARY INSTALLATION EQUIPPED WITH A PURIFIER OF GASEOUS FLUIDS

[76] Inventors: Dominique Tertre, 87, rue Eugené Labiche, 78290 Croissy sur Seine; Chimeng Song, 11 Avenue de la Terrasse, 94200 Saint Maur des Fosses, both of France

[21] Appl. No.: 733,781

[22] Filed: Jul. 22, 1991

[30] Foreign Application Priority Data

Aug. 3, 1990 [FR] France ................... 90 09998

[51] Int. Cl.$^5$ ............................................. B01D 50/00
[52] U.S. Cl. ........................................ 55/337; 55/345; 55/456; 55/431
[58] Field of Search .................. 55/191, 182, 337, 203, 55/204, 456, 338, 345; 210/167, 196, 188, 195.3, 197, 431

[56] References Cited
U.S. PATENT DOCUMENTS

| 3,473,300 | 10/1969 | Wilm et al. | 55/338 |
| 3,922,730 | 12/1975 | Kemper | 210/167 |
| 4,124,409 | 11/1978 | Gladden | 55/91 |
| 4,865,631 | 9/1989 | Stroby et al. | 55/459.1 |

FOREIGN PATENT DOCUMENTS 217439 10/1961 Austria ............................... 55/337

Primary Examiner—Bernard Nozick
Attorney, Agent, or Firm—Armstrong, Westerman, Hattori, McLeland & Westerman

[57] ABSTRACT

A negative pressure installation for treating charged fluids, comprising at least one pipe (2) conveying said charged fluids, a tank (4) for holding the solid and liquid matter, a conduit (5) for evacuation of the gases from the tank (4) to a purifier (6) connected on the one hand to the exterior air by a tube (7) and on the other hand to the pipe (2) by a recycling pipe (10).

Application in sanitary installations of aircraft.

20 Claims, 3 Drawing Sheets

NEGATIVE PRESSURE SANITARY INSTALLATION EQUIPPED WITH A PURIFIER OF GASEOUS FLUIDS

The invention concerns negative pressure sanitary installations, especially those provided in aricraft moving in a low pressure atmosphere, whilst the interior of the cabin is pressurised, i.e. is maintained at normal pressure even at a high altitude.

These installations emit gaseous fluids charged with impurities, in particular in the form of aerosols or mists, which are discharged into the atmosphere. These discharges of impurites bring about disturbances, owing to corrosion phenomena, icing up etc.., which are inadmissible in particular on aeroplanes. In addition, the discharges may comprise dangerous bacteria, particularly as regards human health.

To remedy these disadvantages and others, the inventors have perfected a negative pressure installation (especially for aircraft) to treat charged fluids, issuing from sanitary installations, comprising gases, solid and liquid matter, comprising in particular at least one pipe for conveying said charged fluids connected to the sanitary installations, a holding tank connected to said pipe to recover the solid and liquid matter, a conduit for the evacuation of the gases, one end of which opens out above the tank, which installation is characterised by the fact that the other end of said conduit for the evacuation of the gases opens out into a purifier connected on the one hand with the exterior air under reduced pressure by a tube to evacuate the purified gases and, on the other hand with the conveying pipe or with the tank by a recycling pipe for transporting the impurities collected by said purifier.

Preferably, the tank is surmounted by an enclosure into which open out the pipe or pipes for conveying the charged fluids and the conduit for evacuation of the gases towards the purifier.

The above-mentioned enclosure is termed the separator and is constituted by a cyclone, the centre of which is occupied by the mouth of the conduit for evacuation of the gases towards the purifier.

The purifier is constituted by a cylindrical closed housing of vertical axis A'A with an inlet of the fluids which are to be purified, and an outlet of the purified fluids, internal means to filter the fluids, means to collect the impurities in the bottom of the housing, which purifier device is characterised by the fact that the housing comprises two parallel chambers designated the upper and lower chambers, a horizontal coalescence filter separating the two chambers, an axial conduit conveying the fluids to be purified passing through an axial inlet orifice, the upper chamber and the filter to open out in the lower chamber, a means for evacuation of the impurities collected in the lower part of the housing and a tube evacuating the gaseous purified fluids from an outlet orifice provided at the top of the upper chamber.

The housing constituting the purifier is formed of two half-housing designated the upper and lower housing equipped with means to make them integral one with the other in a sealed manner, whilst permitting their separation in accordance with a plane perpendicular to the axis A'A, the upper half housing in the general form of a cover with a large skirt determines the upper chamber and comprises the inlet and outlet orifices pierced in its ceiling, the lower half housing determines the lower chamber, the bottom of which comprises a hole for the evacuation of the liquids and impurities.

The housing contains the filter through which the fluid which is to be purified is obliged to pass. This filter is of the coalescence type, in the form of a thick disc with a large axial hole, and is mounted in a casing, likewise having an axial hole. The upper plate of the casing has orifices, the area of which is less than the area of the orifices of the lower plate. The unit of the filter and its casing constitutes an independent cartridge which is able to be mounted in the opening of the upper half housing. The gaseous fluid which is to be purified passes through the axial hole, and a spiral-shaped piece gives the fluid a centrifugal force. This spiral may be fixed in the hole of the casing and of the filter, or at the end of the conduit conveying the gases through said hole up into the lower chamber. Under the effect of the centrifugal force, the impurities and the droplets collect then flow on the bottom of the housing. The gaseous fluids, freed of their larger impurities, are then drawn through the coalescence filter and evacuated to the exterior from the upper chamber.

A basket is situated in the lower chamber and is provided with means to collect the liquids and impurities. Said basket comprises a cover resting on its lateral walls and/or a piece fixed on or beneath its bottom, of a material which is able to be impregnated by the droplets of liquids, for example of foam with open pores.

Various internal arrangements are possible, for example the filter with or without spiral may be fixed at the top of the basket such that the whole forms a unit which is easily able to be handled and is interchangeable in a single operation.

The lower part of the bottom of the lower half housing comprises a nozzle provided with an ejector with an inlet of ambient air interior to the vehicle, generating a motive force for entraining the impurities in the recycling pipe from the ejector to the pipe or to the tank.

The ejector comprises a non-return valve.

Figure 4:
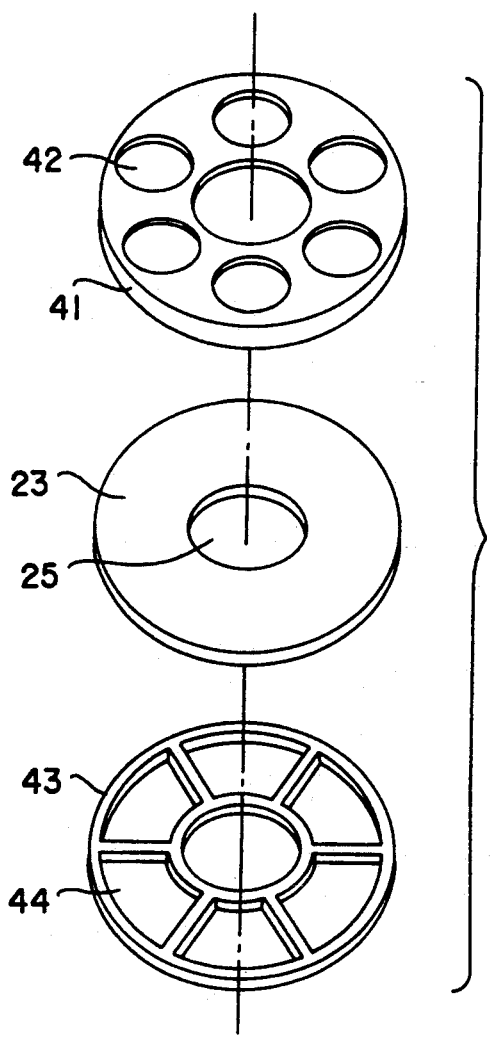
Figure 2:
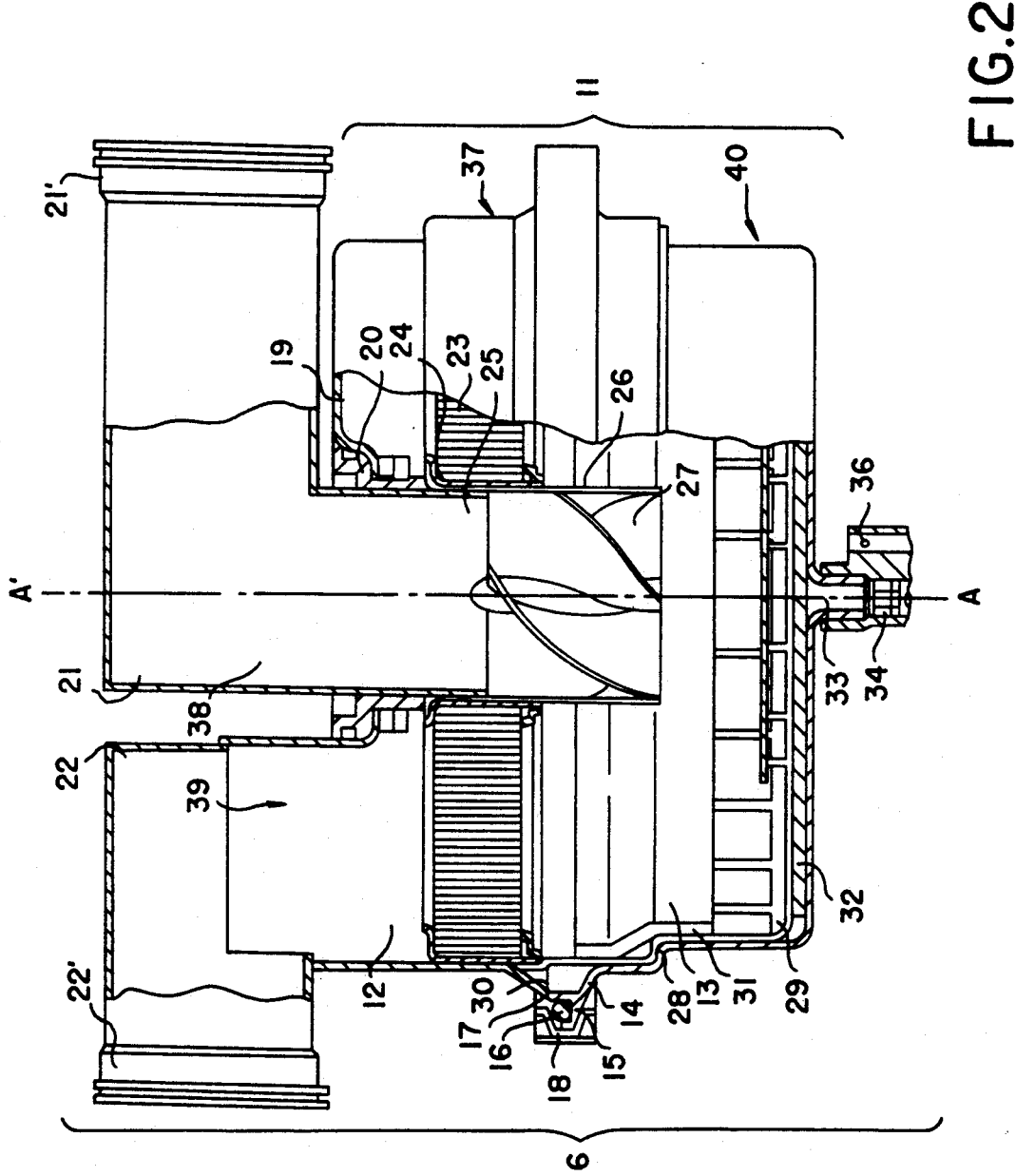
Figure 3:
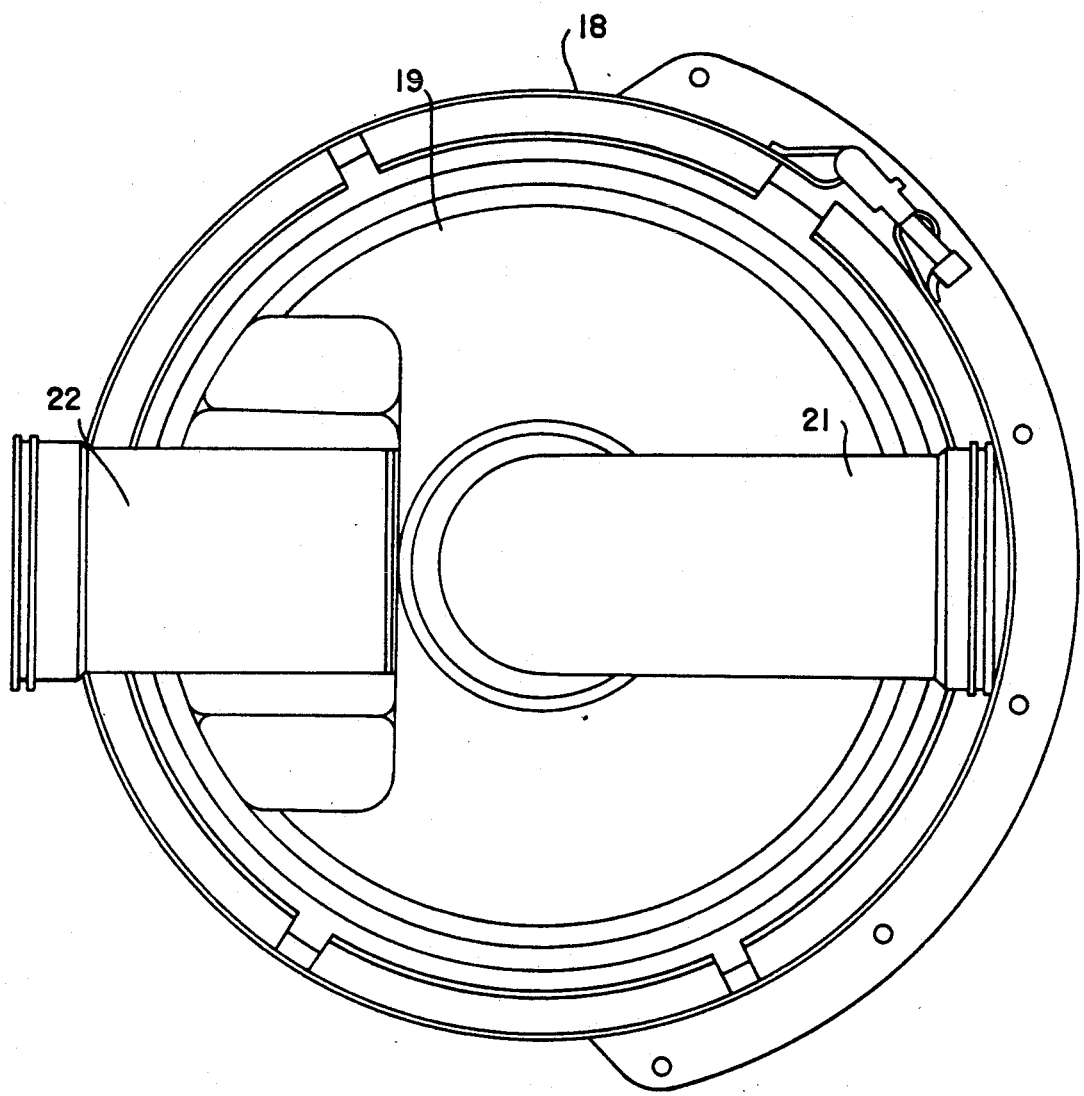

In order that the invention is better understood, an example embodiment is given hereinafter, with reference to the attached drawings in which:

FIG. 1 is a diagram of a sanitary installation for an aeroplane,
FIG. 2 is an axial section of a purifier,
FIG. 3 is a top view of the purifier,
FIG. 4 is an exploded view of the filter and of its casing.

FIG. 1 comprises:
a W.C. pan 1,
an evacuation pipe 2,
a centrifugal separator of waste and used water 3 to which the pipe 2 leads,
a tank 4 placed beneath the separator and receiving the liquid and solid matter dropping from the separator 3,
a conduit 5 evacuating from the separator 3 the gaseous fluids charged with mist and light impurities,
a purifier 6 to which leads the conduit 5 for the gaseous fluids which are to be purified,
a tube 7 directing the gaseous purified fluids towards the exterior of the vehicle (or towards a pump),
a pump 8 accelerating the evacuation of the purified fluids and ensuring a negative pressure in the purifier 6, particularly useful when the exterior pressure is little different from the internal pressure of the aircraft, an orifice 9 for the outlet of the purified fluids into the atmosphere, a pipe 10 recovering the impurities (liquid and solid) at the base of the purifier 6 and injecting them into the pipe 2, so as to be collected in the tank 4.

The purifier 6 is represented in partial section in FIG. 2. It presents itself externally with the appearance of a housing 11 formed of two half housings, one designated the upper housing 37, the other designated the lower housing 40, which are separable according to a plane perpendicular to the axis A'A of said housing. The latter comprises on its upper periphery 14 a circular groove 15 provided with a joint of elastomer 16 on which rests the lower edge 17 of the upper half housing 37. The two half housings 37, 40 are made integral in a sealed manner by a collar 18 which is able to be operated in a conventional manner by means of a lever and a spring (not shown). The half housing 37 determines an upper chamber 12 whilst the half housing 40 determines a lower chamber 13. The ceiling 19 of the upper half housing 37 is pierced by two orifices, one, 38, in the centre, the other, 39, close by (in the crown). In the orifice 38 there is mounted a cylindrical support 20 ensuring that the conduit 21 is fastened in sealed manner, forming a right-angled elbow, with a free end 21'. The conduit 21 is easily orientable for its connection to the portion 5 of conduit integral with the separator 3.

Leaving the orifice 39 is a tube 22 likewise forming an elbow, the end 22' of which is connected to the portion 7 of the evacuation tube towards the pump 8 and/or the orifice 9 for communication towards the exterior.

The coalescence filter 23 is in the form of a crown or thick disc with a large hole and is fitted in a casing 24 of the same shape. Its thickness is a function of numerous parameters, in particular the speed of circulation of the fluids; it may be comprised between five millimeters and twenty millimeters. The filter 23 is constituted by a pile of sheets formed of networks of plastics or metallic wires, knitted for example, or in any other manner.

In the hole 25 of the disc there is inserted a hollow cylinder 26, passing beyond it downwards and in which there is fixed a spiral-shaped piece 27. The casing 24 with its filter 23 and the spiral 27 is driven from bottom to top (in accordance with the figure) in the mouth of the upper part 37 of the housing 11, until the spiral 27 butts on the periphery of the tube 21.

FIG. 4 shows in exploded perspective the filter 23 and its casing 24. The upper part 41 of this casing 24 has the general form of a flap cover, the bottom of which is pierced by a plurality of circular orifices 42, six for example. The lower part 43 of this casing 24 is in the general form of a wheel with spokes having large free spaces 44. The filter 23 is caught in the upper part 41 in which there also penetrates the lower holding part 43. The unit of the filter 23 and its casing 24 constitutes a cartridge, the total area of the orifices 42 of the upper part 41 of which is less than the area of the spaces (44) of the lower part 43.

The lower half housing 40 has an upwardly open lower chamber 13, the wall of which comprises a circular support 28. In this chamber 13 there is arranged a basket 29 having a peripheral configuration which is adapted so as to allow it to rest on the circular support 28, as is clearly visible in FIG. 2.

The upper edge 30 of the basket 29 tends to push the support 24 in the upper part 37 of the housing 11.

The basket 29, and in particular its bottom, is perforated and is provided with means to trap the impurities and the liquids dropping from the spiral 27 and the filter 23. To guide the droplets which run along the wall, and to prevent the recovered liquids from being entrained by the current of gaseous fluid, provision is made to apply a covering 31, made from a material having communicating cavities on said wall. The bottom of the basket 29 is provided with a piece 32 of a material absorbing the liquids, such as a foam with open pores.

The bottom of the lower part 40 of the housing 11 is pierced in its axial part 33, or its lowest part, to fit an ejector 34 having a non-return valve 35. To allow the ejector 34 to function and provide energy, the latter comprises a suction air intake 36 (Venturi).

On the outlet of the ejector 34, a pipe 10 is fixed to conduct the collected liquids and matter back in the pipe 2. The energy necessary for this return is supplied by the ejector, by means of a Venturi effect.

Variant embodiments are possible without, however, departing from the framework of the invention.

The spiral 27 could be mounted on the base of the conduit 21, which may be extended. It is likewise possible to make the casing 24 and the filter 23 integral with the basket 29, the unit formed by the basket and the filter then constituting a single removable element which is able to be easily manipulated.

Generally, the internal elements of the purifier 6 comprise the casing 24 and its filter 23, the spiral 27 and the basket 29 may be mounted separately or joined with each other according to the different possible combinations.

From the ejector 34 a recycling pipe 10 leaves, opening out in the pipe 2 or at the top of the tank. Thus, when the piece 32 fixed beneath the basket is filled with liquid, the latter can be evacuated gradually through the recycling pipe 10 without having to change the basket. The pipe 10 can bring the liquids either in the pipe 2 or to the top of the tank 4, possibly by means of a gate with three paths 45.

In the described installation:
- the charged fluids are evacuated through a pipe 2,
- the gaseous fluids 3 are separated roughly from the solid and liquid matter which drops in the tank 4,
- the gaseous fluids are purified by withdrawing the liquids and other impurities,
- the purified gases are evacuated into the exterior atmosphere under low pressure,
- the liquids and other impurities are collected at the base of a purifier,
- the collected liquids which are flowing out are returned upstream of the holding tank 4, or into the latter.

The motive energy necessary for the return of the liquids and impurities from the ejector 34 to the pipe 2 or to the tank 4 originates from the difference in pressure between the tank 4 and the air supply of the ejector, being able to originate from the ambient environment at normal pressure.

We claim:

1. A negative pressure system for handling waste comprising gases, solid matter and liquid matter, the negative pressure system comprising:
   at least one pipe for conveying said waste, said at least one pipe for connecting to a respective sanitary installation;
   a holding tank in fluid communication with said at least one pipe for receiving solid and liquid matter from said waste;

a conduit having first and second ends for evacuation of gases from said waste, said first end in fluid communication with a top portion of the holding tank;

a separating means mounted on said holding tank, wherein said separating means is connected between said holding tank and said at least one pipe for conveying said waste, and wherein said separating means is connected between said holding tank and said conduit for evacuation of gases;

a purifier, wherein said second end of said conduit is connected to said purifier;

a tube connected to said purifier to evacuate the purified gases from said purifier; and a recycling pipe for transporting impurities collected by said purifier to at least one of said holding tank and said at least one pipe;

said purifier having:

a closed housing with a vertical axis;

a purifier inlet connected to said second end of said conduit for the fluids which are to be purified;

a purifier outlet for the purified fluids;

internal filtering means to filter the fluids entering the purifier via said purifier inlet;

collecting means to collect impurities in the bottom of the housing of the purifier;

two parallel chambers comprising an upper chamber and a lower chamber;

a horizontal coalescence filter separating the two chambers;

an axial conduit for conveying the fluids to be purified from said purifier inlet, via the upper chamber and the coalescence filter to said lower chamber; and means for evacuation from the purifier of the impurities collected at the lower part of the housing.

2. A negative pressure system for handling waste according to claim 1, wherein said separating means comprises a cyclone having a center, and wherein said first end of said conduit for evacuation of gases is connected to said separating means adjacent said center of said cyclone.

3. A negative pressure system for handling waste according to any one of the preceding claims, further comprising a pump mounted on said tube for evacuation of the gases purified by the purifier.

4. A negative pressure system for handling waste according to claim 1, further comprising
the tube for evacuating the purified fluids from said outlet of said purifier, said outlet provided at a top portion of the upper chamber of the purifier.

5. The negative pressure system for handling waste according to claim 4, wherein a bottom of the basket is provided with a piece of a material capable of being impregnated by droplets of liquid.

6. The negative pressure system for handling waste according to claim 4, wherein the housing comprises an upper housing, a lower housing and sealing means for sealing said upper and lower housings integral with each other along a plane perpendicular to the vertical axis of the purifier, wherein the upper housing comprises a cover with a large skirt for defining the upper chamber and comprises the inlet and outlet orifices in a ceiling thereof, and wherein the lower housing defines the lower chamber, the bottom of said lower chamber comprising a hole for evacuation of liquids and impurities.

7. The negative pressure system for handling waste according to claim 6, wherein the lower housing comprises a lateral wall having a circular internal support.

8. The negative pressure system for handling waste according to claim 6, wherein said axial conduit is bent externally to the housing, said inlet of the housing being provided with a cylindrical support for ensuring the sealed fixing of the axial conduit, the axial conduit being bent within a support for orientation toward the bent end of said axial conduit.

9. The negative pressure system for handling waste according to claim 8, further comprising a spiral-shaped piece fixed in the mouth of the axial conduit.

10. The negative pressure system for handling waste according to claim 6, wherein the coalescence filter is in the form of a disc with an axial hole and is fitted in a casing having a central hole.

11. The negative pressure system for handling waste according to claim 10, wherein the casing and filter are driven from bottom to top in the mouth of the upper half housing of the housing, the lower part of the conduit sealingly disposed within the hole of the disc.

12. The negative pressure system for handling waste according to claim 10, wherein the casing is formed by an upper part having orifices therein and a lower part comprising wide free spaces, the total area of the orifices being less than that of the free spaces.

13. The negative pressure system for handling waste according to claim 10, wherein said axial hole of the coalescence filter has inserted therein a spiral-shaped piece.

14. The negative pressure system for handling waste according to claim 13, wherein said spiral-shaped piece is driven from bottom to top in the upper half housing of the housing, and wherein said spiral-shaped piece abuts the lower periphery of said axial conduit.

15. The negative pressure system for handling waste according to claim 4, further comprising a basket disposed in the lower chamber and comprising means to for collecting liquids and impurities.

16. The negative pressure system for handling waste according to claim 15, wherein said basket comprises a peripheral portion arranged to rest on the support of the lower housing of the housing.

17. The negative pressure system for handling waste according to claim 15, further comprising a covering resting on lateral walls of the basket, said covering comprising a material capable of being impregnated by droplets of liquid.

18. The negative pressure system for handling waste according to claim 15, wherein the filter is fixed to the upper part of the basket which is interchangeable.

19. The negative pressure system for handling waste according to claim 4, wherein a lower part of the bottom of the lower half housing of the housing comprises a nozzle provided with an ejector having an inlet for ambient air, and for generating a motive force for sucking the impurities in the recycling pipe from the ejector to at least one of the pipe and the tank.

20. The negative pressure system for handling waste according to claim 19, wherein the ejector comprises a non-return valve.

* * * * *